(12) United States Patent
Burget

(10) Patent No.: US 8,459,383 B1
(45) Date of Patent: Jun. 11, 2013

(54) SPHERICAL DRIVE SYSTEM

(76) Inventor: Daniel Burget, Meridian, ID (US)

( * ) Notice: Subject to any disclaimer, the term of this patent is extended or adjusted under 35 U.S.C. 154(b) by 117 days.

(21) Appl. No.: 13/178,259

(22) Filed: Jul. 7, 2011

Related U.S. Application Data

(60) Provisional application No. 61/362,921, filed on Jul. 9, 2010.

(51) Int. Cl.
*B62D 57/00* (2006.01)
(52) U.S. Cl.
USPC .............................. 180/7.1; 180/7.2; 301/5.23
(58) Field of Classification Search
USPC .............................. 180/6.2, 7.1, 7.2; 301/5.23
See application file for complete search history.

(56) References Cited

U.S. PATENT DOCUMENTS

| | | | |
|---|---|---|---|
| 6,508,335 B2 * | 1/2003 | Zinanti | 188/1.12 |
| 2009/0188729 A1 | 7/2009 | Berry et al. | |
| 2010/0270850 A1 * | 10/2010 | Brudniok | 301/5.23 |

* cited by examiner

*Primary Examiner* — Kevin Hurley
*Assistant Examiner* — Marc A Scharich
(74) *Attorney, Agent, or Firm* — Head, Johnson & Kachigian, P.C.

(57) ABSTRACT

A spherical drive system for a vehicle providing movement in multiple directions. The spherical drive system can be maneuvered either by a system of driven omnidirectional wheels or by an electromagnetic field. One embodiment includes two pairs of omnidirectional drive wheels working in complement to each other providing multi-directional movement by way of electronic motors which are wired to a controller. A spherical tire will reside within the shell and will be in direct contact with the omnidirectional drive and stabilizer wheels. The spherical tire will work in tandem with the omnidirectional drive and stabilizer wheels moving the vehicle in the appropriate direction. Another embodiment is driven by an electromagnetic field created with magnets placed inside the spherical wheel and electromagnets placed on an outer shell. The electromagnetic field will drive the spherical wheel moving the vehicle in the appropriate direction.

18 Claims, 2 Drawing Sheets

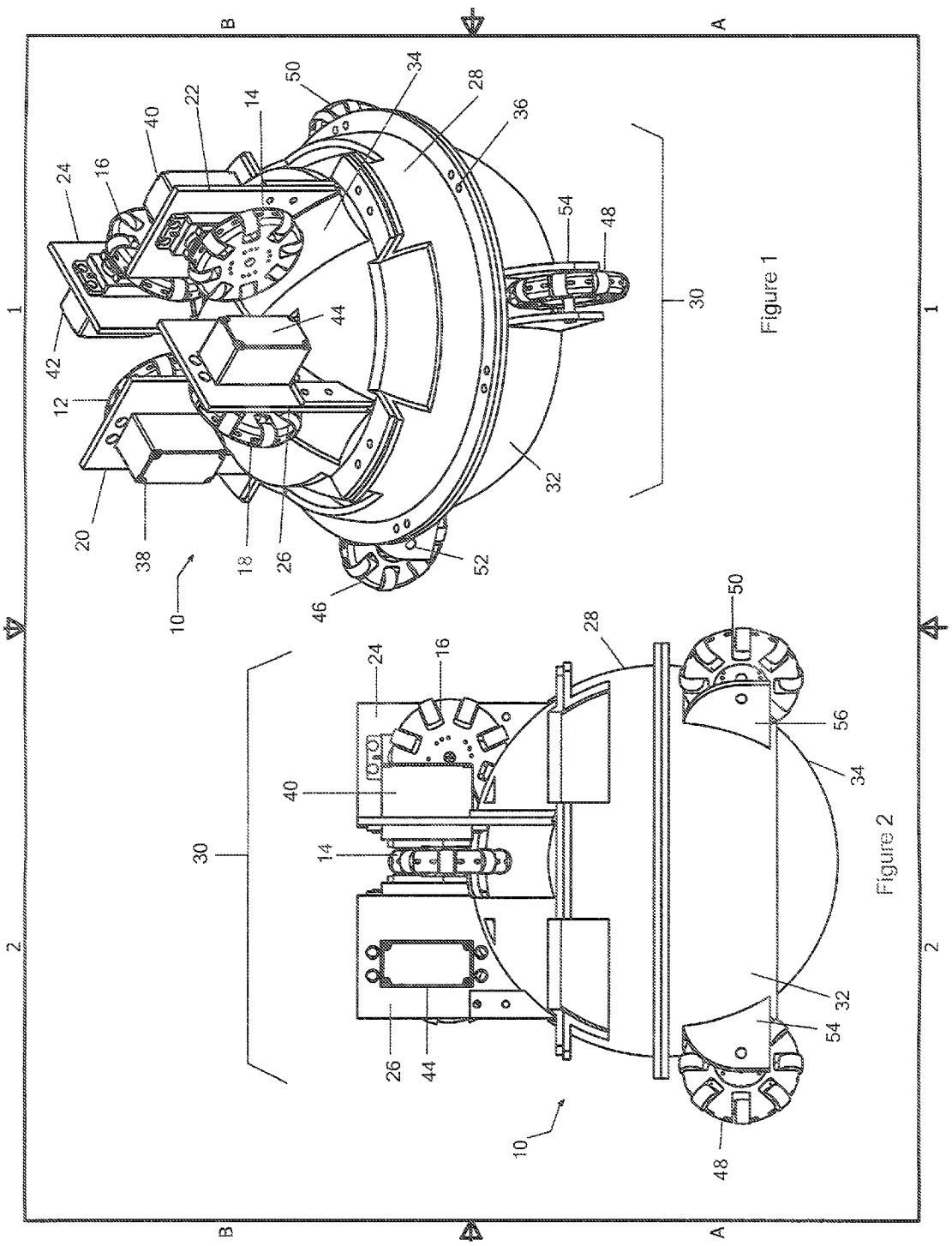

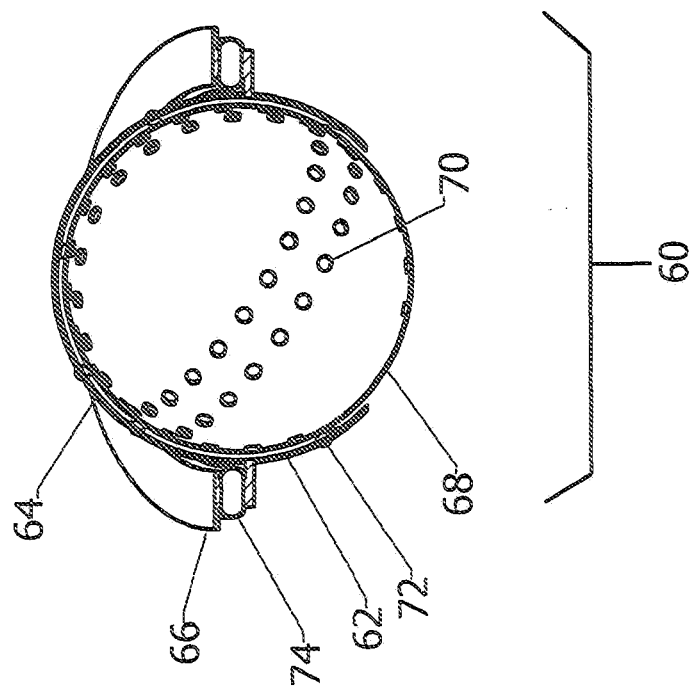
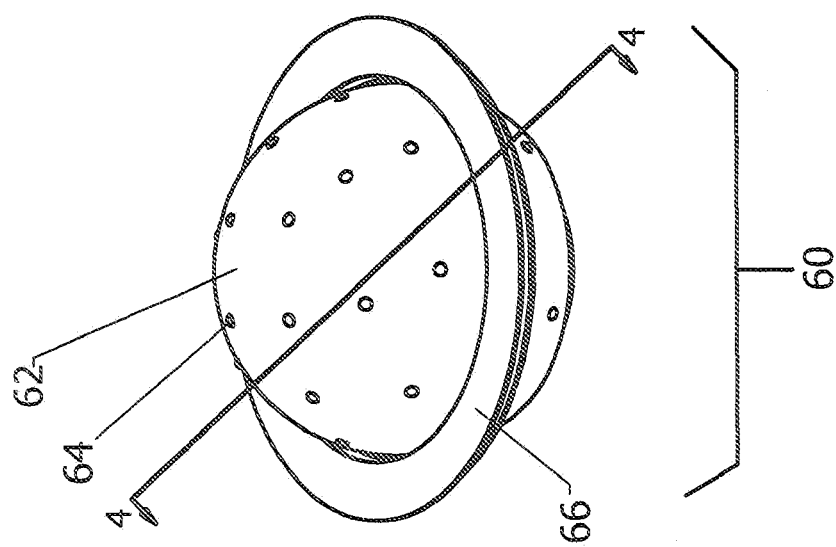
Figure 4
Figure 3

SPHERICAL DRIVE SYSTEM

CROSS-REFERENCE TO RELATED APPLICATIONS

This application claims priority to U.S. Provisional Application No. 61/362,921, filed Jul. 9, 2010, which is herein incorporated by reference.

BACKGROUND OF THE INVENTION

1. Field of the Invention

The present invention pertains to a drive system, and more particularly a spherical wheel based drive system.

2. Prior Art

The use of omnidirectional wheels is known for allowing multi-directional movement in objects. Omnidirectional wheels work in tandem with each other in a motorized design. When the wheels begin to rotate, the object which rests upon the wheels will move in an appropriate direction. There have been designs in the past that use omnidirectional wheels in wheelchairs and forklifts creating multi-directional movement. Past designs using omnidirectional wheels have not provided smooth directional movement from side to side, and have not been adequate to utilize in vehicles.

The use of a spherical wheel is also known for allowing multi-directional movement. One example of a spherical wheel is shown in Berry et al. (U.S. Patent Publication No. 2009/0188729). The use of spherical wheels in the area of transportation would open up many possibilities and advantages to the automotive industry, such as multi-directional movement and ease in parking.

To date, spherical wheels have not been employed on vehicles, thus, there remains a need for the design to incorporate such use and its advantages.

Accordingly, it is a principal object and purpose of the present invention to provide a spherical wheel assembly to maneuver a vehicle in multiple directions and to ease parking capabilities.

SUMMARY OF THE INVENTION

The present invention is directed to a spherical wheel assembly for a vehicle having at least two different embodiments. A first embodiment uses a system of omnidirectional wheels in tandem with a spherical wheel and a second embodiment employs a magnetic field within the spherical wheel assembly.

The first embodiment of the present invention includes two pairs of omnidirectional drive wheels and three omnidirectional stabilizer wheels in tandem with a spherical tire to form an assembly creating multi-directional movement. Omnidirectional wheels are constructed with small guide rollers around the circumference of a wheel to allow an object to be multi-directional. The general effect of multi-directional movement is to provide lateral movement with great ease across all surfaces. In general, these multi-faceted wheels are used in tandem with many types of vehicles and objects to provide all types of directional movement.

The omnidirectional drive wheels are guided by a controller and work in complement to each other to move the object in the appropriate direction. The controller may be mounted either on the wheel assembly or elsewhere near the wheel. Each one of the omnidirectional drive wheels are solidly constructed to mounts built on an upper component of an outer shell. The spherical tire fits securely within the outer shell composed of top and bottom components which are fastened together. There are also three omnidirectional stabilizer wheels attached to the bottom component of the outer shell which provide movement and stabilize the spherical tire. All of the omnidirectional wheels are in continuous contact with the spherical tire and work in tandem with the tire to create multi-directional movement. The spherical tire moves in a smooth manner under the guidance of the omni-drive wheels and the omni-stabilizer wheels.

The second embodiment employs the use of a magnetic system comprised of magnets strategically positioned on the spherical tire and electromagnets strategically placed on the outer shell. The spherical tire may be composed of a rubber material similar to that of tires on the market today. The spherical tire may contain an interior structure composed of stiff foam or rubber. The spherical tire is enclosed by an outer shell which attaches to the wheel frame. The outer shell may be composed of a non-iron aluminum alloy. The outer shell is comprised of top and bottom components which are fastened together by the wheel frame, thus the outer shell is removable in order for the spherical tire to be replaced. Contact friction between the outer shell and the spherical tire is reduced by the implementation of a plurality of bearings between the tire and outer shell that keep the spherical tire centered and in place. The spherical wheel is attached to the vehicle by way of said frame which allows for air ride suspension.

This invention is meant to assist in parking or maneuvering vehicles into tight spaces with greater ease. This invention will also allow a quicker response than current four wheel drive models, and only require either two or three wheels to be attached to a vehicle.

BRIEF DESCRIPTION OF THE DRAWINGS

FIG. 1 illustrates a perspective view of an omni directional wheel assembly constructed in accordance with a first preferred embodiment of the present invention; and FIG. 2 illustrates a side view of the omnidirectional wheel based assembly according to the first embodiment of the present invention shown in FIG. 1; and FIG. 3 illustrates a perspective view of a magnetic spherical wheel assembly according to a second preferred embodiment of the present invention; and FIG. 4 illustrates a sectional view of a magnetic spherical wheel assembly taken along section line 4-4 of FIG. 3 according to the second embodiment of the present invention.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention provides at least two embodiments featuring the use of a spherical tire. A first embodiment is a method of using omnidirectional wheels in tandem with a spherical tire to provide multi-directional movement. A second embodiment uses a spherical wheel assembly driven by an electromagnetic field.

Referring to the drawings in detail, FIG. 1 illustrates a perspective view of an omni-directional wheel assembly 10 in accordance with a first preferred embodiment of the present invention.

A plurality of omnidirectional drive wheels 12, 14, 16, and 18 are directly attached to mounts 20, 22, 24, and 26, respectively, that protrude from an upper component 28 of an outer shell 30. Omnidirectional drive wheels 12 and 14 are aligned with each other while wheels 16 and 18 are aligned with each other. Each omnidirectional wheel 12-18 may be composed of a heavy duty plastic or rubber material to withstand high speeds and friction.

The assembly also includes a lower component 32.

When upper 28 and lower 32 components are joined together, a hollow shell is formed for a spherical tire 34 to fit within the removable outer shell 30. The outer shell 30 may be composed of heavy duty plastic or metallic material. The outer shell 30 is composed of a durable material to endure the weight and movement of a vehicle. The outer shell 30 is slightly larger than the spherical tire 34 so that the spherical tire 34 can rotate but not fit loosely within the outer shell 30. In order to secure an assembly 10 to a vehicle, brackets 36 are reinforced onto the outer rim of the shell 30 so that shocks (not shown) can be secured from the assembly 10 to a vehicle (not shown).

As FIG. 1 illustrates, the pair of omnidirectional drive wheels 12 and 14 and the pair 16 and 18 work in conjunction and complement with one another providing movement in a desired direction. Each drive wheel 12-18 works in tandem with the wheel directly across from it, creating movement forward and backward, while the other pair of drive wheels work in complement providing side to side movement. As an example, in order to move a vehicle at a desired angle, the omnidirectional drive wheels 12 and 14 continuously move forward or backward while the pair 16 and 18 will continuously move either left or right; the pairs will work together to create the desired angular movement. Each omnidirectional drive wheel 12-18 contains guide rollers on the wheels to reduce friction. These rollers are parallel to the tangent of the omnidirectional drive wheel, and are also free rolling to provide movement in tandem with the spherical tire 34.

Each omnidirectional drive wheel 12-18 has an electronic motor, 38-44, respectively, that is also attached to the mounts 20-26, respectively, on the upper component 28 of the outer shell 30. For example, omnidirectional drive wheel 12 has an electronic motor 38 attached to mount 20.

Each electronic motor 38-44 provides and controls the movement of each respective omnidirectional drive wheel 12-18 to steer the assembly 10 in the appropriate direction. Each electronic motor 38-44 is connected to a controller (not shown in FIG. 1) which controls movement of the respective motors 38-44. Various types of controllers could be employed within the spirit and scope of the invention. The controller can be mounted either on the omnidirectional wheel assembly 10 or separate from the assembly, thus the controller is wired to each electronic motor 38-44.

FIG. 2 illustrates a side view of the omni directional wheel assembly 10 shown in FIG. 1. The spherical tire 34 is secured within the outer shell 30 slightly protruding from the bottom to make contact with a surface (not shown). The outer shell 30 contains openings where each omnidirectional drive wheel 12-18 has been attached. Thus, each omnidirectional drive wheel 12-18 is in direct contact through the opening with the spherical tire 34 to maneuver the wheel assembly 10 in the appropriate direction. The spherical tire 34 may be composed of the same rubber material as current tires on the market. The spherical tire 34 may contain treads to grip the surface and move the vehicle in an appropriate direction.

As FIGS. 1 and 2 illustrate, three omnidirectional stabilizer wheels 46, 48, and 50 are attached to the lower component 32 of the outer shell 30. The omnidirectional stabilizer wheels 46-50 may be constructed in the same manner as the drive wheels 12-18 attached onto the upper component 28 of the assembly 10. The omnidirectional stabilizer wheels 46-50 on the lower component 32 are in direct contact with the spherical tire 34, so each stabilizer wheel works in tandem with the spherical tire 34. The omnidirectional stabilizer wheels 46-50 are attached onto the lower component 32 to heavy duty mounts 52, 54, and 56 built onto the lower component 32 of the outer shell 30. The omnidirectional stabilizer wheels 46-50 on the lower component 32 stabilize the spherical tire 34 within the outer shell 30 when the assembly 10 is moving in multiple directions at high speeds.

FIG. 3 illustrates a perspective view of a preferred embodiment of an electromagnetically based assembly 60 in accordance with the present invention. An outer shell 62 houses a spherical tire 68. The outer shell 62 may be composed of a non-feuromagnetic material, such as non-iron aluminum alloy, durable enough to endure the weight and movement of a vehicle. The outer shell 62 may contain upper and lower components which are removably latched together and form a hollow encasing slightly larger than the spherical tire (not shown). Electromagnets 64 are strategically placed on the surface of the outer shell 62. A frame 66 encircles the outer shell and serves to attach the outer shell 62 housing the spherical wheel 68 to the vehicle. The frame 66 also serves to attach the upper and lower components of the outer shell 62 together.

FIG. 4 illustrates a sectional view, taken through section line 4-4 of FIG. 3, of a spherical wheel assembly based on an electromagnetic field 60 in accordance with the present invention. An outer shell 62 houses a spherical tire 68. The spherical tire 68 may be composed of the same rubber material as current tires on the market. A frame 66 encircles and circumnavigates the outer shell serving to attach the outer shell 62 and spherical wheel assembly to the vehicle. The frame 66 also serves to attach the upper and lower components of the outer shell 62. The frame 66 is equipped with air ride suspension 74. Magnets 70 are strategically placed inside the spherical wheel 68. The magnets 68 on the spherical wheel 68 interact with the electromagnets 64 that are placed on the outer shell 62. Bearings 72 are placed between the outer shell 62 and the spherical wheel 68 in order to alleviate friction and to keep the spherical wheel 68 in the center of the outer shell 62. The creation of the magnetic field is used to drive the spherical wheel, allowing it to move in any direction.

Whereas, the present invention has been described in relation to the drawings attached hereto, it should be understood that other and further modifications, apart from those shown or suggested herein, may be made within the spirit and scope of this invention.

What is claimed is:

1. An omni directional wheel assembly for a vehicle, which assembly comprises:

two pairs of omnidirectional drive wheels wherein each said omnidirectional drive wheel complements each other within said pair wherein each said omnidirectional drive wheel is connected to an electronic motor which motor is wired to a controller to move said drive wheel;

an outer shell, wherein said omnidirectional drive wheels attached to said outer shell contains a hollow encasing;

a spherical tire, said tire enclosed within said outer shell; and a plurality of omnidirectional stabilizer wheels attached to a lower component of said outer shell.

2. An omni directional wheel assembly for a vehicle as set forth in claim 1 wherein each said omnidirectional drive wheel is secured to mounts on said outer shell.

3. An omni directional wheel assembly for a vehicle as set forth in claim 1 wherein said pairs of said omnidirectional drive wheels with guide rollers axis parallel to tangent of said omnidirectional drive wheel work in a continuous sequence with one another to move the assembly in any direction.

4. An omni directional wheel assembly for a vehicle as set forth in claim 1 wherein said omnidirectional drive wheels are in direct contact with said spherical tire to generate directional movement.

5. An omni directional wheel assembly for a vehicle as set forth in claim 1 wherein said controller is attached to said vehicle or directly mounted on the assembly.

6. An omni directional wheel assembly for a vehicle as set forth in claim 1 wherein said outer shell contains upper and lower components which are removably latched together.

7. An omni directional wheel assembly for a vehicle as set forth in claim 6 wherein said outer shell contains brackets on an outer edge of the outer shell to attach to shocks of said vehicle.

8. An omni directional wheel assembly for a vehicle as set forth in claim 6 wherein said upper component of said outer shell has four mounts that said omnidirectional drive wheels and said electrical motor are securely attached.

9. An omni directional wheel assembly for a vehicle as set forth in claim 1 wherein said spherical tire is composed of rubber material.

10. An omni directional wheel assembly for a vehicle as set forth in claim 9 wherein said spherical tire is housed within said outer shell providing directional movement of said omni directional wheel assembly.

11. An omni directional wheel assembly for a vehicle as set forth in claim 1 wherein said omnidirectional stabilizer wheels are mounted onto said lower component of said outer shell.

12. An omni directional wheel assembly for a vehicle as set forth in claim 11 wherein said omnidirectional stabilizer wheels with guide rollers parallel to tangent of said omnidirectional stabilizer wheels are in direct contact with said spherical tire to control movement and stabilize said assembly.

13. A spherical wheel assembly for a vehicle, wherein assembly comprises:
   an outer shell, with plurality of electromagnets placed at specific points on said outer shell;
   a spherical tire, said spherical tire enclosed within said outer shell;
   a plurality of magnets strategically placed at specific points inside said spherical tire, wherein said electromagnets on said outer shell correspond with said magnets on said spherical tire;
   and a frame encircling said outer shell.

14. A spherical wheel assembly for a vehicle as set forth in claim 13 wherein said outer shell is comprised of upper and lower components which are removably latched together.

15. A spherical wheel assembly for a vehicle as set forth in claim 14 wherein said outer shell is composed of a non-iron aluminum alloy.

16. A spherical wheel assembly for a vehicle as set forth in claim 13 wherein said spherical tire is composed of a rubber material.

17. A spherical wheel assembly for a vehicle as set forth in claim 13 wherein assembly includes a plurality of bearings between said outer shell and said spherical tire that serve to reduce friction and keep said spherical tire in the center of said outer shell.

18. A spherical wheel assembly for a vehicle as set forth in claim 13 wherein said frame is equipped with air ride suspension.

\* \* \* \* \*